United States Patent [19]
Ries-Mueller

[11] Patent Number: 5,675,967
[45] Date of Patent: Oct. 14, 1997

[54] METHOD AND ARRANGEMENT FOR EVALUATING THE OPERABILITY OF A CATALYTIC CONVERTER

[75] Inventor: Klaus Ries-Mueller, Bad Rappenau, Germany

[73] Assignee: Robert Bosch GmbH, Stuttgart, Germany

[21] Appl. No.: 157,089

[22] PCT Filed: Mar. 20, 1993

[86] PCT No.: PCT/DE93/00257

§ 371 Date: Dec. 3, 1993

§ 102(e) Date: Dec. 3, 1993

[87] PCT Pub. No.: WO93/20340

PCT Pub. Date: Oct. 14, 1993

[30] Foreign Application Priority Data

Apr. 3, 1992 [DE] Germany .................. 42 11 092.0

[51] Int. Cl.$^6$ .................................................. F01N 3/20
[52] U.S. Cl. ............................... 60/274; 60/277; 60/284
[58] Field of Search ........................ 60/277, 284, 274

[56] References Cited

U.S. PATENT DOCUMENTS

| | | |
|---|---|---|
| 3,962,866 | 6/1976 | Neidhard et al. . |
| 3,969,932 | 7/1976 | Rieger et al. . |
| 5,060,473 | 10/1991 | Nakagawa . |
| 5,177,463 | 1/1993 | Bradshaw ............................ 60/277 |

FOREIGN PATENT DOCUMENTS

| | | |
|---|---|---|
| 0231611 | 8/1987 | European Pat. Off. . |
| 0236659 | 9/1987 | European Pat. Off. . |
| 0433735 | 6/1991 | European Pat. Off. . |
| 2643739 | 3/1978 | Germany . |
| 3500594 | 7/1986 | Germany . |
| 3516981 | 11/1986 | Germany . |
| 4122787 | 1/1992 | Germany . |
| 3015619 | 1/1991 | Japan . |
| 1373826 | 11/1974 | United Kingdom . |
| WO 91/14856 | 10/1991 | WIPO . |

OTHER PUBLICATIONS

"Langzeitstabilität von Katalysatoren" by E. Koberstein, VDI Berichte Nr. 639, 1987, pp. 345 to 360.

"The Effect of High Temperature Ageing on Platinum–Rhodium and Palladium–Rhodium Three Way Catalysts" by R. J. Brisley et al, SAE Technical Paper Series 910175, 1991.

*Primary Examiner*—Douglas Hart
*Attorney, Agent, or Firm*—Walter Ottesen

[57] ABSTRACT

The invention is directed to a method for evaluating the operability of a catalytic converter operated in the exhaust-gas channel of an internal combustion engine. The invention utilizes the recognition that the conversion-begin temperature of the catalytic converter is that much higher the more the catalytic converter has deteriorated. In improved embodiments, the realization is utilized that the more a catalytic converter has deteriorated, the less heat is converted by combusting oxidizable exhaust gas components per unit of time. In a first embodiment of the method, a check is made as to when a catalytic converter starts converting and then evaluating the converter as being operable when the determined temperature is less than a comparison temperature. A second embodiment provides that the catalytic converter is operated at precisely pregiven operating conditions and a check is made as to how long is required until the converter begins to convert. The catalytic converter is operable if the measured time span is less than a comparison time span. In a third embodiment, the temperature of the catalytic converter is estimated with a model. As soon as the estimated temperature reaches a comparison temperature, a check is made as to whether the catalytic converter has exceeded this temperature. If this is the case, then the catalytic converter is evaluated as being operable. Arrangements according to the invention include devices for carrying out the steps required for the above-mentioned methods.

3 Claims, 6 Drawing Sheets

METHOD AND ARRANGEMENT FOR EVALUATING THE OPERABILITY OF A CATALYTIC CONVERTER

FIELD OF THE INVENTION

The following relates to a method and an arrangement for evaluating the operability of a catalytic converter which is operated in the exhaust-gas channel of an internal combustion engine.

BACKGROUND OF THE INVENTION

U.S. Pat. No. 3,969,932 describes a method and an arrangement wherein the operability of a catalytic converter is determined with the aid of a time measurement which is a measure of the storage capacity of the catalytic converter. The catalytic converter is first entirely charged with oxygen in that the corresponding internal combustion engine is operated lean adequately long. Then, the engine is operated rich with pregiven operating conditions whereby the oxygen stored in the catalytic converter is consumed. The exhaust gas outputted by the catalytic converter has the lambda value 1 as long as the catalytic converter can still supply oxygen to the exhaust gas conducted thereto. However, as soon as the oxygen is consumed, a lambda value measurement at the output of the catalytic converter shows a rich mixture. The time span between the start of the rich operation and the time point at which this is detected at the output of the catalytic converter is a measure for the state of deterioration of the catalytic converter. The shorter this time span is, the greater the catalytic converter has deteriorated. The catalytic converter is evaluated as no longer being operable when the measured time span drops below a pregiven time span.

The lambda value signals are set in relationship to each other in other methods for determining the operability of a catalytic converter as these signals are detected forward and rearward of a catalytic converter. Thus, for example, in U.S. Pat. No. 3,962,866, a description is provided that the operability is determined with the aid of the difference between the amplitudes of the above-mentioned two signals. The catalytic converter is determined as being no longer operable as soon as the difference drops below a threshold value. According to published German patent application 3,500, 594, the ratio of the amplitudes is utilized in lieu of the difference, with this ratio also being averaged.

SUMMARY OF THE INVENTION

From the points in time of the filing of the above-mentioned patent-related literature, it can be seen that experts have, for a long time, been trying to reliably evaluate the operability of a catalytic converter. A method satisfactory for all cases could, however, still not be found. Accordingly, the desire was present to find additional methods and arrangements for evaluating the operability of a catalytic converter operated in the exhaust gas of an internal combustion engine.

A first method according to the invention is characterized in that: the engine is operated proceeding from a state in which the temperature of the catalytic converter is below the temperature at which a new catalytic converter begins to convert; a check is made as to the temperature at which the catalytic converter, which is heated by the exhaust gas of the engine, begins to convert; the determined conversion-begin temperature is compared to a pregiven comparison temperature, this comparison temperature being above the temperature at which a new catalytic converter begins to convert; and, the catalytic converter is evaluated to be operable when the determined conversion-begin temperature is below the comparison temperature.

A second method according to the invention is characterized in that: the engine has pregiven operating conditions and is operated proceeding from a state in which the temperature of the catalytic converter is below the temperature at which a new catalytic converter begins to convert; the time span is measured which the catalytic converter requires to reach a comparison temperature which is above the conversion-begin temperature for a new catalytic converter; the measured time span is compared to a pregiven comparison time span; and, the catalytic converter is evaluated to be operable when the measured time span is shorter than the comparison time span.

A third method according to the invention is characterized in that: the engine is operated proceeding from a state in which the temperature of the catalytic converter is below the temperature at which a new catalytic converter begins to convert; the curve of the temperature of the catalytic converter is estimated from a model into which respective particular values of operating variables of the engine and of the catalytic converter are inputted; a check is made as to the actual temperature of the catalytic converter when the temperature estimated from the model has reached a comparison temperature which is above the conversion-begin temperature of a new catalytic converter; and, the catalytic converter is evaluated as being operable when the actual temperature of the catalytic converter is above the comparison temperature.

The arrangements according to the invention include devices for carrying out the above-mentioned steps.

The methods and arrangements according to the invention are based on the following realization. A catalytic converter is heated at a certain heating rate when the converter is heated by the exhaust gas of an internal combustion engine after a cold start thereof. This heating rate is essentially dependent upon the heat capacity of the catalytic converter, the heat supplied by the engine and the heat dissipated by the converter. As soon as the catalytic converter has reached a conversion-begin temperature, the catalytic converter itself can develop heat in that the converter combusts oxidizable exhaust-gas components with the oxygen stored therein. As soon as this happens, the temperature of the converter increases considerably faster than would be the case only for heating by the heat quantity stored in the exhaust gas of the engine. It has been shown that the conversion-begin temperature is very greatly dependent upon the state of deterioration of the catalytic converter. A certain pregiven comparison temperature is therefore reached by a new converter substantially faster than by an old converter. This comparison temperature is above the conversion-begin temperature of a new catalytic converter.

The first method according to the invention directly uses the above-mentioned recognition that the conversion-begin temperature is dependent upon the deterioration of the catalytic converter. The second and the third methods according to the invention are still more sensitive when compared thereto since not only does the conversion-begin temperature become included therein but also the conversion dynamic which likewise deteriorates with increasing converter age so that even when the conversion has started, this cannot lead to a temperature increase which is as rapid in an old converter as with a new one. The conversion-begin temperature increases with deterioration of the catalytic converter. This time-dependent response can either be checked in that the engine and the catalytic converter are operated with precisely pregiven operating conditions and the time span is measured until the comparison temperature is reached or, it is estimated from a model when the catalytic converter should have reached the comparison temperature and a check is then made as to whether this actually is present.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
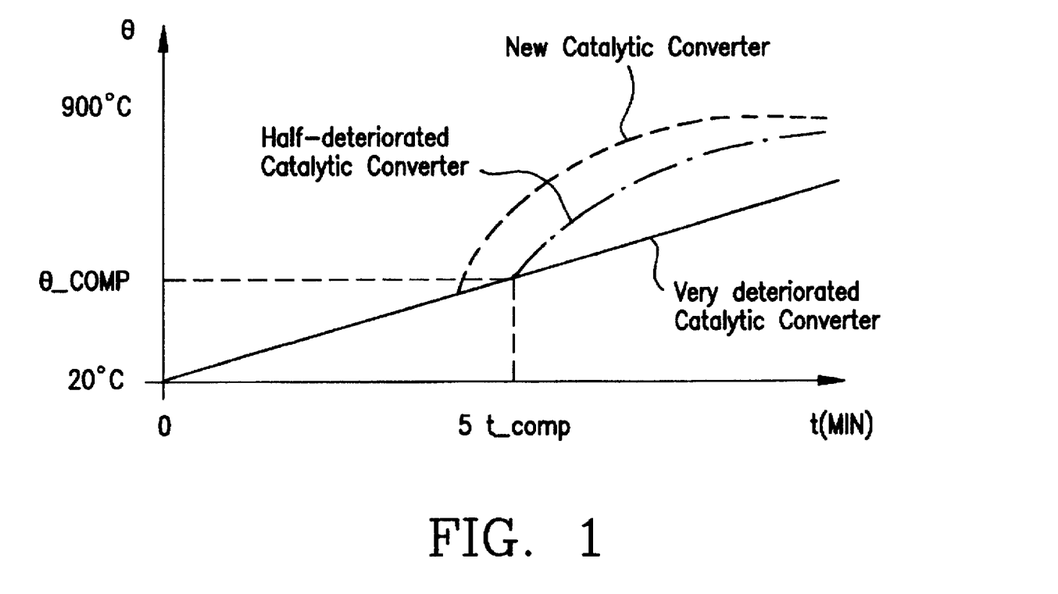
FIG. 1 is a diagram showing the time-dependent trace of the heating of three catalytic converters of different states of deterioration.

FIG. 1 shows the time-dependent trace of the heating of a catalytic converter with the latter being heated by the exhaust gas of an internal combustion engine which is operated at a relatively low load. It takes approximately 5 minutes in order to heat the catalytic converter from 20° C. to 300° C. The conversion-begin temperature of a relatively new catalytic converter is thereby essentially reached. Starting at this temperature, oxidizable exhaust-gas components are combusted with heat being developed as known so that the catalytic converter is additionally heated by this heat. For this reason, its temperature increases considerably steeper than would be the case previously for heating only by the hot exhaust gas. The steeper temperature increase for the new catalytic converter is shown by a broken line; whereas, the temperature trace for a very deteriorated catalytic converter, which can no longer convert by being simply heated, is shown with a solid line. When the catalytic converter has deteriorated only halfway, then the catalytic converter has an increased conversion-begin temperature, for example, a temperature of 350° C. and the temperature increase caused by the combustion heat is less steep than for a new catalytic converter. This can be seen from the dash-dot line in FIG. 1.

Figure 2:
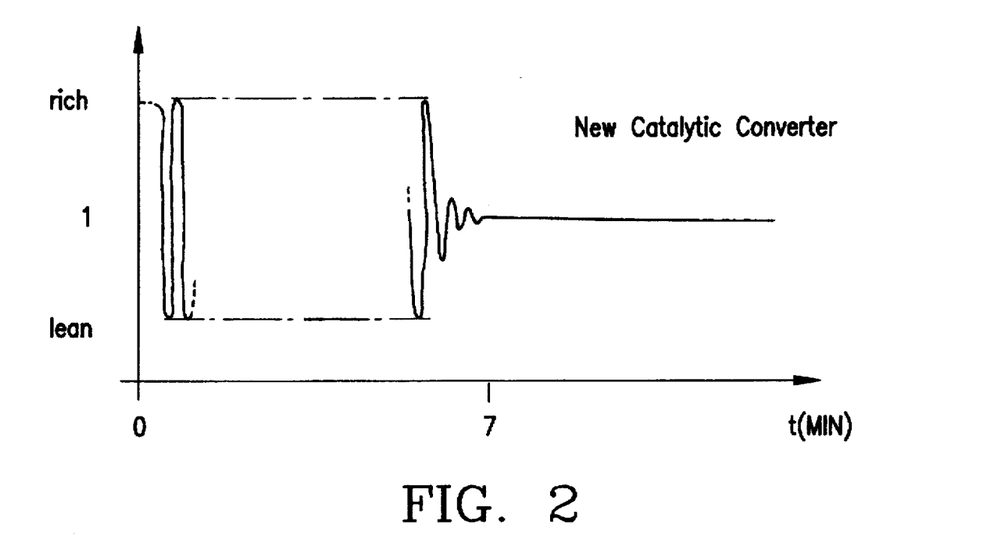
FIG. 2 is a schematic showing the time-dependent trace of the output signal of an oxygen probe mounted rearward of a catalytic converter with the signal trace being correlated in time with the signal trace for the new catalytic converter in FIG. 1.

FIG. 2 shows the trace of the output signal of an oxygen probe correlated in time with the temperature trace for the new catalytic converter of FIG. 1. This oxygen probe is mounted at the output of the catalytic converter. After approximately 30 seconds, the heated probe has reached a temperature at which the probe measures correctly the lambda value of the exhaust gas which flows past the probe. The same applies to a probe mounted forward of the catalytic converter and with which the internal combustion engine is lambda controlled. Up to this time point, the engine is operated rich which is shown dotted in FIG. 2 for the signal measured by the rearward probe since in this start time frame, the probe actually emits a signal having a different trace. As soon as the probe is operationally warm, the probe shows the fluctuations of the two-point lambda control which show a period of several seconds for change between lean and rich and vice versa. As soon as the catalytic converter has reached its conversion-begin temperature at time point t__CONV, that is, after approximately 5 minutes, the amplitude of the slightly averaged fluctuations becomes ever less until finally, with reaching the complete conversion capability, the value "1" is maintained continuously, assuming that the control is to this value of lambda.

Three methods and corresponding arrangements can be derived from FIGS. 1 and 2 as they will be described in greater detail with respect to FIGS. 3 and 4, 5 and 6 and 7 and 8. The first possibility comprises checking when the catalytic converter starts to convert, to detect the corresponding catalytic converter temperature and to check whether this temperature is below a pregiven comparison temperature θ__COMP. In FIG. 1, this comparison temperature is so selected that it corresponds essentially to the conversion-begin temperature for the half-deteriorated catalytic converter having the dash-dot temperature line. The catalytic converter is evaluated as being operable when the actual measured temperature for conversion begin of the particular catalytic converter is below this comparison temperature. For a two-point control, the conversion begin is determined with the aid of the fluctuation amplitude of the output signal of the oxygen probe arranged rearward of the catalytic converter.

In a second method, the engine and the catalytic converter are operated at precisely pregiven operating conditions, for example, those conditions at which the curves according to FIG. 1 were determined. A comparison time span Δt__COMP is assigned to the above-mentioned comparison temperature θ__COMP which time span corresponds to the difference between the start time point of the method and the conversion begin of a catalytic converter which can just barely still be used. If the actual time span, which is measured up to the conversion begin, is less than the comparison time span, this shows that the catalytic converter is operational.

A third possibility comprises estimating the temperature trace of the catalytic converter with a model. Here, a catalytic converter which can just barely be used is used for the model after reaching the conversion-begin temperature and for the heat occurring during the conversion. As soon as the catalytic converter according to this model should have reached a comparison temperature, the actual temperature is checked either by direct temperature measurement or by investigation as to whether the catalytic converter already converts. If it results that the actual temperature is greater than the comparison temperature, this shows that the catalytic converter is operational. Alternatively to the above-mentioned procedure, a check can be made as to when the catalytic converter actually reaches the comparison temperature. The temperature is then determined which is expected in accordance with the model. When this temperature is less than the actual temperature, this shows that the actually checked catalytic converter converts better than the converter assumed for the model which is just barely useable. The actual catalytic converter is then accordingly evaluated as being operational.

Figure 3:
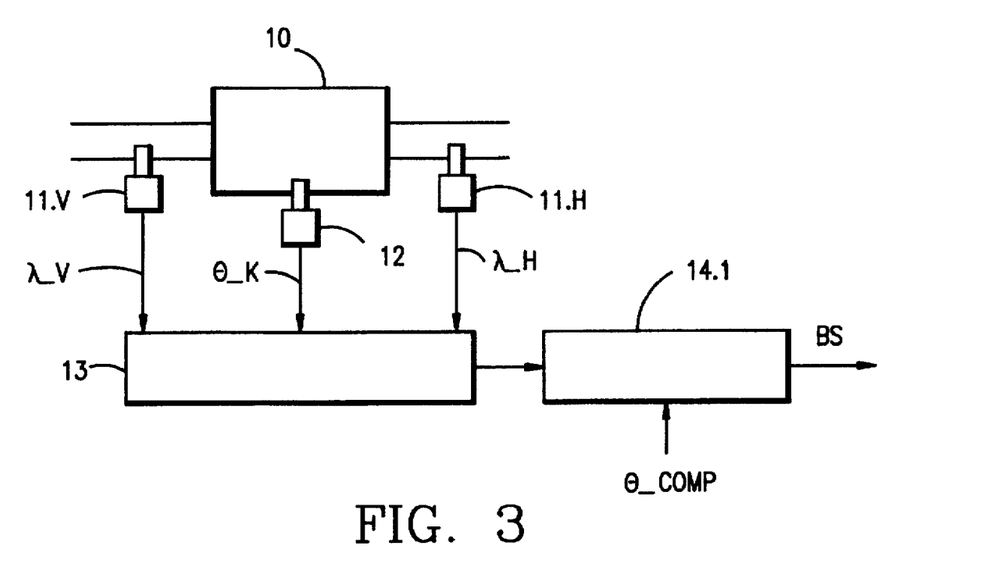
FIG. 3 is a block diagram showing a first method and a first arrangement for determining the operability of the state of deterioration of a catalytic converter.

The block diagram of FIG. 3 shows a catalytic converter 10 having an oxygen probe 11.V which is arranged forward and an oxygen probe 11.H which is arranged rearward of the catalytic converter. These probes are referred to in the following as the forward probe and rearward probe. The temperature of the catalytic converter 10 is measured with a temperature sensor 12. A check is made in a checking block 13 as to whether the catalytic converter has reached its conversion-begin temperature and, if this is the case, this temperature θ_CONV is detected. In a comparison/ evaluation block 14.1, the temperature is compared to a comparison temperature θ_COMP. When the conversion-begin temperature θ_CONV for the actual catalytic converter is below the comparison temperature θ_COMP, then the comparison/evaluation block 14.1 emits an evaluation signal BS which shows that the catalytic converter is operational.

Figure 4:
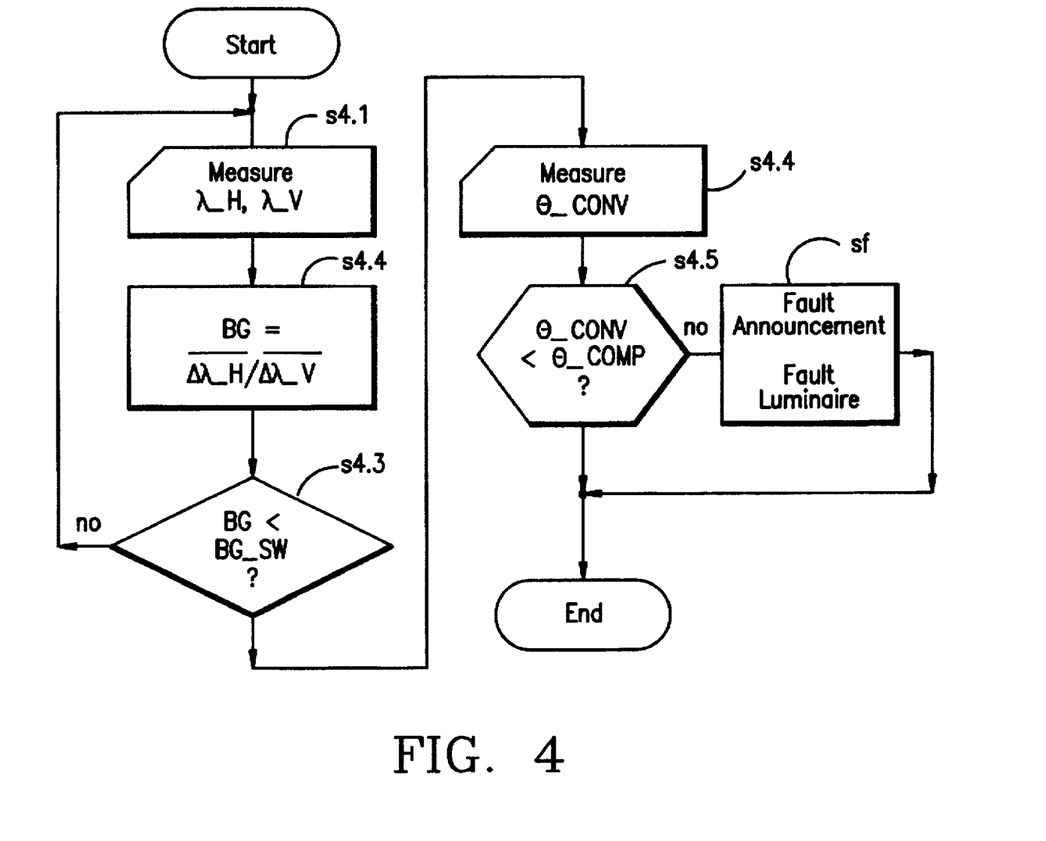
FIG. 4 is a flowchart which can be realized in accordance with the function blocks of the block diagram of FIG. 3.

The method described briefly directly above is now explained with reference to FIG. 4. In step s4.1, lambda values λ_emitted by the rearward and forward lambda probes are measured (the outputted voltages can be also used directly). Then (step s4.2) an evaluation variable BG is computed which corresponds to the ratio of the averaged lambda value fluctuations as they are detected by the rearward and forward probes. If it results in step s4.3 that the evaluation variable has not yet dropped below a threshold value BG_SW, then this shows that the catalytic converter still does not correctly convert. The steps s4.1 to s4.3 are then repeated. If it results in step s4.3 that the catalytic converter now converts satisfactorily, the corresponding temperature θ_CONV is measured (step s4.4) and a check is made as to whether this temperature is below the comparison temperature θ_COMP (step s4.5). The method is ended if this is the case. Otherwise, in a fault step sf, a fault announcement is outputted and a fault luminaire is caused to illuminate which displays to the driver of the motor vehicle having the engine and the catalytic converter that the catalytic converter should be checked.

Figure 5:
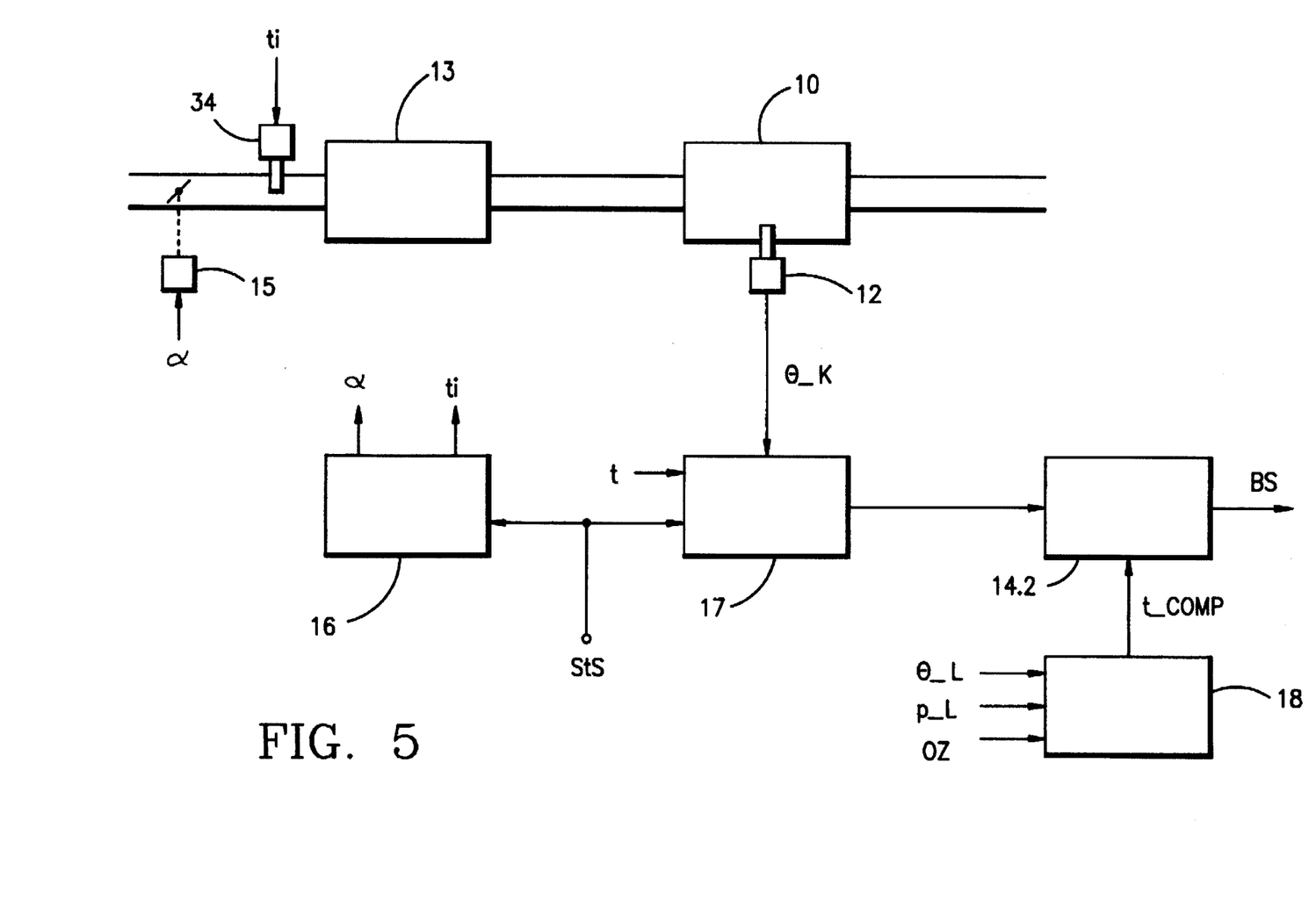
FIGS. 5 and 6 show schematics corresponding to FIGS. 3 and 4, respectively, but for a second method and a second arrangement for determining the operability of a catalytic converter; and, FIGS. 7 and 8 are schematics corresponding to FIGS. 3 and 4 but for a third method and a third arrangement for determining the operability of a catalytic converter.

The block diagram of FIG. 5 includes the following: the catalytic converter 10 to which a temperature sensor 12 is attached, an internal combustion engine 13, an injection arrangement 34 and a throttle flap arrangement 15 which outputs a throttle flap angle signal α. A control sequence is set into operation by means of motor control block 16 with the aid of a start signal StS. This control sequence ensures that the internal combustion engine 13 is operated under pregiven conditions, preferably idle at medium load. This ensures a relative slow warming of the catalytic converter so that the time point of the conversion begin of the catalytic converter can be measured with relatively good precision. This time measurement is carried out via a time-measuring block 17 which detects the time span from the start of the engine to the time point at which the catalytic converter temperature detected by the temperature sensor 12 reaches the comparison temperature explained with respect to FIG. 1. In a comparison/evaluation block 14.2, a check is made as to whether the measured time span Δt is greater than a comparison time span Δt_COMP. The comparison time span is outputted by a comparison-time preset block 18 which determines this comparison time span in dependence upon the air temperature θ_L, the air pressure p_L and the octane number OZ of the fuel supplied to the internal combustion engine 13. If the above-mentioned comparison condition is satisfied, then the comparison/evaluation block 14.2 outputs an evaluation signal BS which shows that the catalytic converter 10 is operational.

Figure 6:
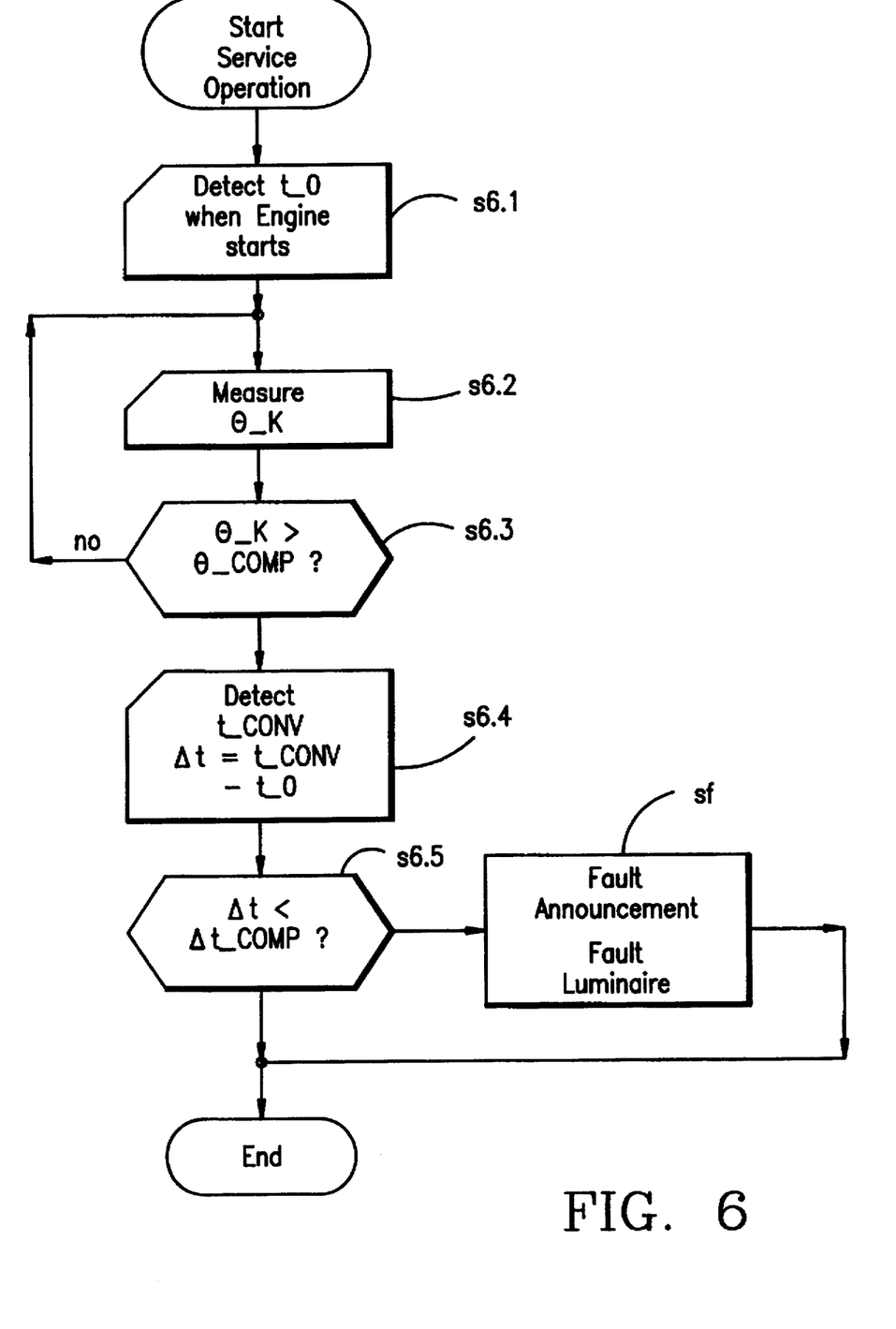

The method briefly explained above with respect to FIG. 5 is now described in greater detail with respect to FIG. 6. The corresponding time point t_0 is detected in a step s6.1 when the engine is started. Then, the catalytic converter temperature θ_K is measured (step s6.2) and a check (step s6.3) is made as to whether this temperature has exceeded the comparison temperature θ_COMP. If this is not the case, the steps s6.2 and s6.3 are repeated so long until the catalytic converter exceeds the comparison temperature. The corresponding time point t_CONV is detected and the difference Δt between the above-mentioned two time points is detected. This difference is the time span which the catalytic converter needed to reach the comparison temperature θ_COMP starting from pregiven start conditions for pregiven operating conditions. A check is made in step s6.5 as to whether this time span Δt is less than the comparison time span Δt_COMP. If this is the case, then the method is ended, otherwise, the fault step sf follows as explained for FIG. 4.

The method mentioned just above is suitable for making checks in a service station. The method is started as soon as pregiven start conditions are satisfied, for example, the catalytic converter temperature is below 30° C. and the engine temperature below 50° C. The method is then carried out with the motor vehicle at standstill at precisely determined operating conditions.

Figure 7:
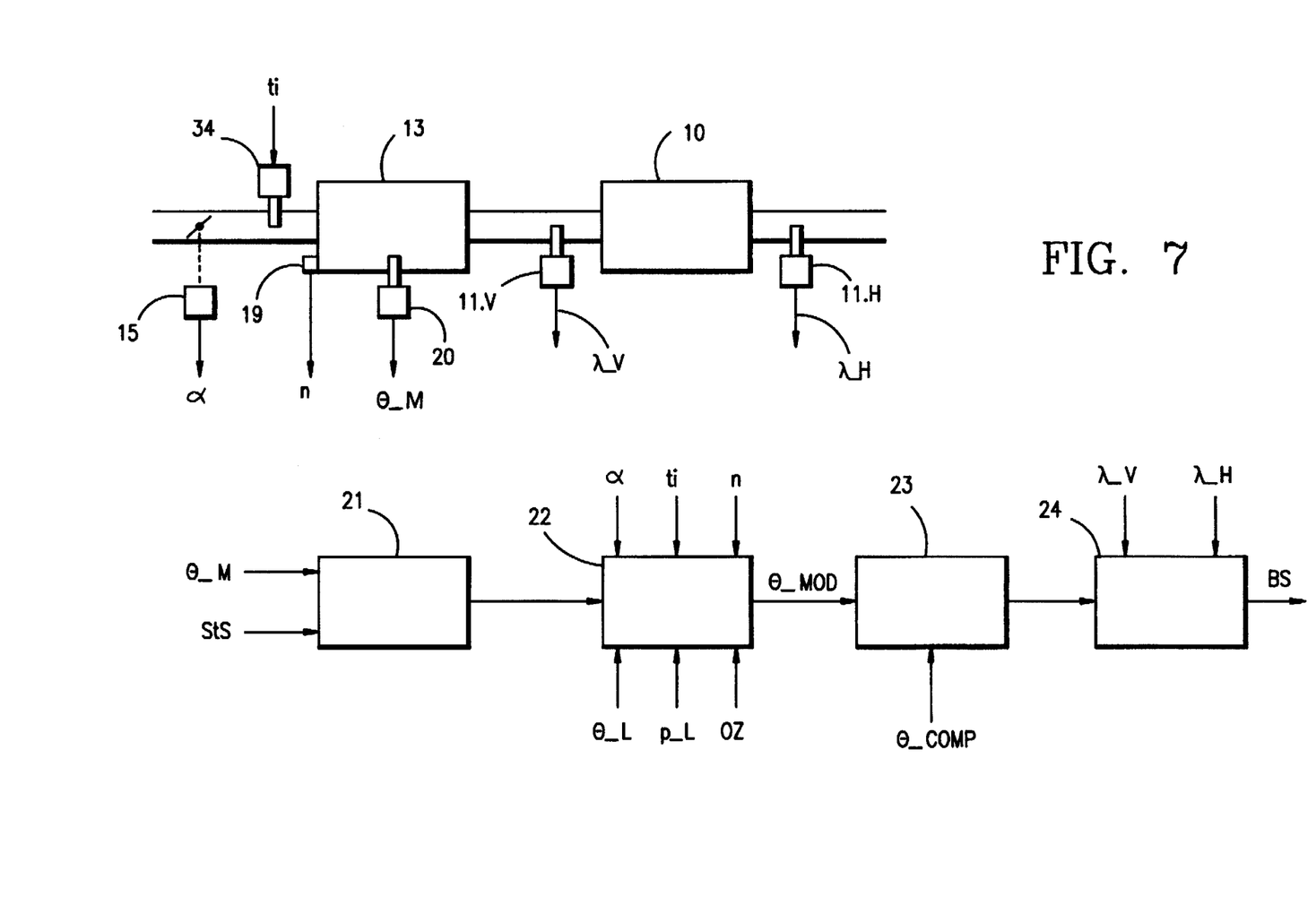
Figure 8:
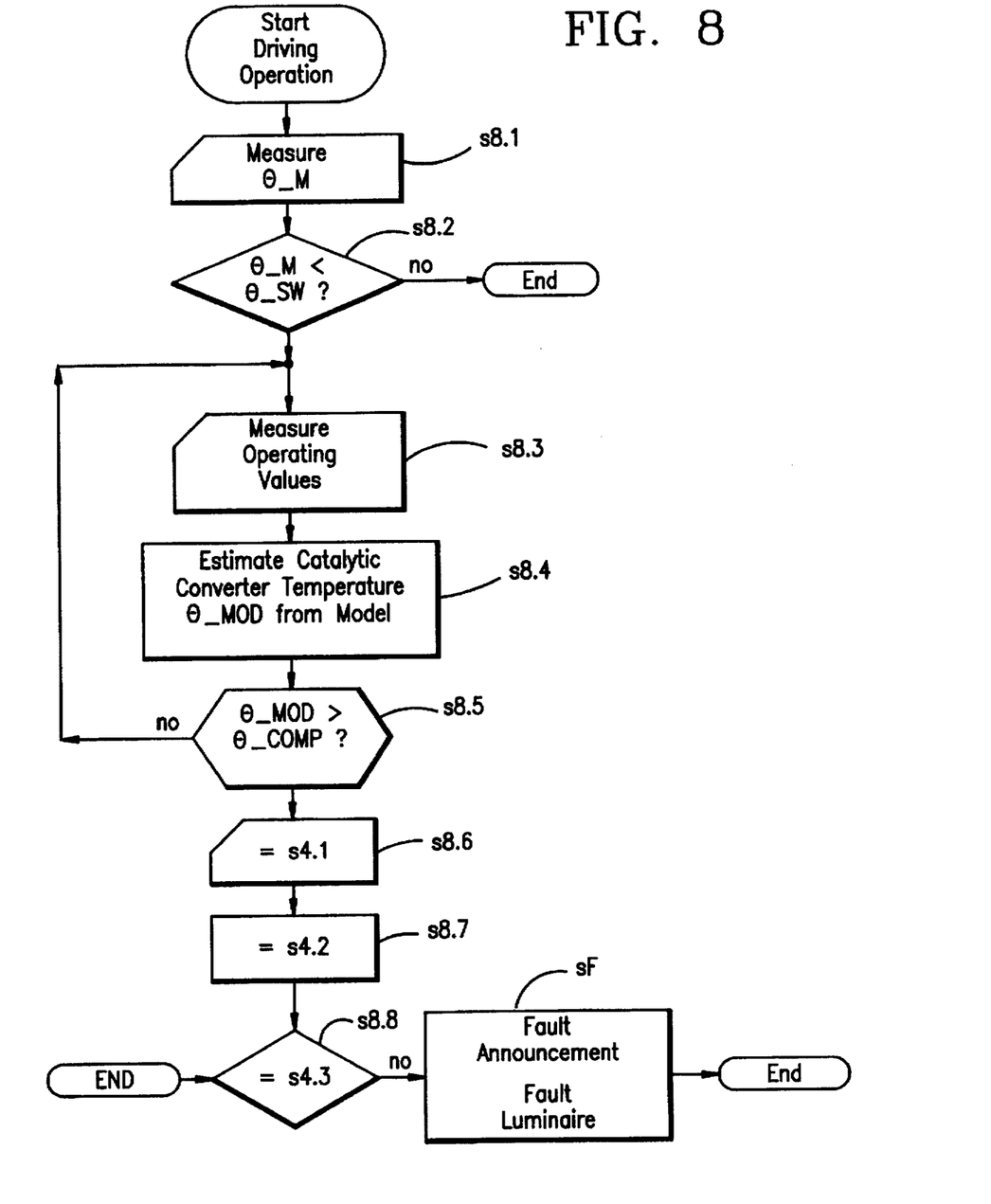

In contrast, a method as described with respect to FIGS. 7 and 8 can be carried out also during the driving operation of a motor vehicle. Here, the temperature performance of the catalytic converter is simulated by a model. For this purpose, the heat capacity of the catalytic converter must first be known. Furthermore, the heat quantity supplied to the catalytic converter by the engine must be estimated. This takes place best by detecting the fuel quantity supplied to the engine and by computing the component of the combustion energy which is supplied to the catalytic converter. The component of the combustion energy is dependent upon the particular load state and the rpm (n) of the engine. For each small time unit, the heat quantity, which is supplied to the catalytic converter, can be detected from the fuel quantity, load and rpm. These heat quantities are added in order to obtain the total heat quantity which the catalytic converter receives after the start of the method. Furthermore, the heat quantity must still be estimated which the catalytic converter gives off to the ambient. The temperature of the catalytic converter estimated from such a heat quantity model is compared to the actual temperature of the converter as described above in connection with FIGS. 1 and 2. The greater the precision with which the temperature model operates, the more precise are the results supplied by the method.

The block diagram of FIG. 7 shows the catalytic converter 10, the forward lambda probe 11.V, the rearward lambda probe 11.H, the injection device 18, the throttle flap device 15, an rpm sensor 19 and an engine temperature sensor 20. A start signal block 21, a temperature model block 22, a first comparator 23.1 and a second comparator 23.2 are provided for the control. The start signal block 21 starts an evaluation method when this is desired in accordance with a start signal StS and when the engine temperature θ_M is below a threshold. It would be still more reliable to measure the temperature of the catalytic converter and to start the method only when this temperature is below a threshold. In connection with FIGS. 7 and 8, the assumption is made that the method is only started when the catalytic converter is at approximately ambient temperature. After the start of the method, the temperature model block 22 determines a temperature θ_MOT estimated for the catalytic converter with this determination being made with the aid of the above-mentioned variables Δ, n, ti, θ_L, p_L and OZ. This temperature θ_MOT is compared to a comparison temperature θ_COMP in a first comparison block 23. This comparison temperature θ_COMP is selected in the manner mentioned above. As soon as this condition is satisfied, the evaluation device 24 checks whether the catalytic converter is already converting. This can be carried out with the aid of the signal λ_H and possibly additionally with the signal λ_V as described further above in connection with FIG. 4.

The method briefly explained with respect to FIG. 7 is now explained in greater detail with respect to the flowchart of FIG. 8. The engine temperature θ_M is measured in a step s8.1 after the start of the method. A check is made in step s8.2 as to whether the engine temperature θ_M is above a threshold temperature θ_SW. If this temperature is above the threshold temperature θ_SW, then the method is immediately ended because it cannot be excluded that the catalytic converter is already heated to over its conversion-begin temperature. On the other hand, if a cold start is present, values of operating variables of the internal combustion engine and of the catalytic converter are measured (step s8.3). The estimated catalytic temperature θ_MOD is determined (step s8.4) with the aid of the detected values and a model for the temperature of the catalytic converter. Then a check is made (step s8.5) as to whether the estimated temperature has reached the above-mentioned comparison temperature θ_COMP. If this is not the case, then the steps s8.3 to s8.5 are repeated. Otherwise, steps s8.6 to s8.8 are carried out which correspond completely to the steps s4.1 to s4.3 with which a check is made as to whether the catalytic converter already converts. If it results in step s8.8 that the catalytic converter still does not convert even though the comparison temperature θ_COMP is exceeded, then a fault step sf is reached which corresponds to the step of FIG. 4 which is correspondingly identified. Thereafter, or directly after step s8.8, the end of the method is reached when the catalytic converter converts properly.

In the methods described above, it has been assumed that a fault luminaire is caused to illuminate directly with the fault step sf. The display of a fault can, however, also take place only when a pregiven number of fault announcements has occurred within a pregiven number of test sequences. Then, the number of counted fault announcements can again be reduced when no further fault announcements occur within a pregiven number of test sequences. It is not important as to the manner in which a fault announcement is handled which is supplied by the method of the invention; instead, it is only important that, to determine a fault, the realization is utilized that a catalytic converter develops conversion heat that much later and slower the poorer its operability is.

In the embodiment of FIGS. 5 and 6, it had been assumed that the time measurement takes place by utilizing the signal of the temperature sensor 12. However, the time span can also be measured which elapses from the start of the method until a sequence according to steps s4.1 to s4.3 has been announced that the catalytic converter converts properly. Then, the time span so determined is compared to the comparison time span Δt_COMP.

In the corresponding opposite direction, the method explained with respect to FIGS. 7 and 8 can be utilized in that a check is not made in the evaluation block 24 as to whether the catalytic converter converts properly when the conditions checked in comparison block 23 are satisfied; instead, a check is made as to whether the catalytic converter temperature is above the comparison temperature θ_COMP.

I claim:

1. A method for evaluating the operability of a catalytic converter operated in the exhaust-gas channel of an internal combustion engine, the method comprising the steps of:

operating the engine by proceeding from a state in which the temperature of the catalytic converter is below the temperature at which a new catalytic converter begins to convert;

determining the temperature of the catalytic converter at a time point at which the catalytic converter, which is heated by the exhaust gas of the engine, begins to convert toxic substances in the exhaust gas;

comparing the conversion-begin temperature determined at said time point to a pregiven comparison threshold temperature, said comparison threshold temperature being above the temperature at which a new catalytic converter begins to convert; and, evaluating the catalytic converter to be operable when the determined conversion-begin temperature is below said comparison threshold temperature.

2. An arrangement for evaluating the operability of a catalytic converter operated in the exhaust-gas channel of an internal combustion engine, the arrangement comprising:

means for checking the temperature of said catalytic converter and determining at which temperature the catalytic converter, which is heated by the exhaust gas of the engine, begins to convert toxic substances in the exhaust gas;

comparison/evaluation means for comparing the determined conversion-begin temperature to a comparison threshold temperature, the determined conversion-begin temperature being above the conversion-begin temperature of a new catalytic converter; and, said comparison/evaluation means being adapted to evaluate the catalytic converter as being operable when the determined conversion-begin temperature is below the comparison temperature.

3. The method of claim 1, wherein said temperature of said catalytic converter at said time point being the only temperature measured and being measured at only one location.

* * * * *